United States Patent [19]

Namdari

[11] Patent Number: 5,320,859

[45] Date of Patent: Jun. 14, 1994

[54] HIGH PROTEIN DOUGH MIX

[76] Inventor: Bahram Namdari, P.O. Box 17366, Milwaukee, Wis. 53217

[21] Appl. No.: 239,947

[22] Filed: Sep. 2, 1988

[51] Int. Cl.$^5$ .............................................. A21D 10/00
[52] U.S. Cl. ................................... 426/551; 426/549; 426/552
[58] Field of Search .................. 426/549, 551, 552

[56] References Cited

U.S. PATENT DOCUMENTS

| | | | |
|---|---|---|---|
| 3,348,951 | 10/1967 | Evans | 426/551 |
| 3,919,434 | 11/1975 | Tsen et al. | 426/551 |
| 4,421,777 | 12/1983 | Chung | 426/551 |

Primary Examiner—Donald E. Czaja
Assistant Examiner—Mary S. Mims
Attorney, Agent, or Firm—Andrus, Sceales, Starke & Sawall

[57] ABSTRACT

A high protein dough mix for a leavened bakery product, consisting essentially of, by weight, in unflavored form, a blend of up to 20% water, 10-80% of a protein containing material selected from the group consisting of soy products, gluten, milk products, whey products, egg products and nuts, 10-80% of a sweetener, up to 40% of a vegetable shortening, up to 50% flour, and up to 8% of a leavening agent. The dough mix may be baked and served as a cookie, a muffin, a cake, a brownie, or a snack bar.

7 Claims, No Drawings

HIGH PROTEIN DOUGH MIX

BACKGROUND OF THE INVENTION

The present invention relates to a food compositions, and more particularly to a high protein dough mix for a leavened bakery product.

In recent years, various products have been marketed as substitutes for complete meals. For example, "instant" breakfast powders have been marketed which are mixed with milk and then eaten as a substitute for a full breakfast. Such products have become popular due to the "modern" fast paced lifestyles of some people who have little time for preparing food and eating a meal. Additionally, such products have become popular for people who do not wish to take time out from their busy work schedules to prepare and eat a meal.

Therefore, it is desirable to provide a nutritional protein enriched food product which may be eaten as a meal substitute. Various high protein food products are known, as illustrated in the following U.S. Pats.:

| U.S. Pat. No. | Inventor | Issue Date |
| --- | --- | --- |
| 2,654,672 | Selman Jr., et al | Oct. 6, 1953 |
| 2,989,399 | Ehle | June 20, 1961 |
| 3,252,807 | Kuramoto | May 24, 1966 |
| 3,615,677 | Scharschmidt et al | Oct. 26, 1971 |
| 3,883,669 | Tsen et al | May 13, 1975 |
| 3,949,093 | Mehltretter et al | Apr. 6, 1976 |
| 3,950,545 | Hayward et al | Apr. 13, 1976 |
| 4,109,025 | Lauck | Aug. 22, 1978 |
| 4,137,336 | Radlove | Jan. 30, 1979 |
| 4,324,811 | Eugley | Apr. 13, 1982 |

SUMMARY OF THE INVENTION

A high protein dough mix for a leavened bakery product consisting essentially of, by weight, in unflavored form, a blend of up to 20% water, 10-80% of a protein containing material selected from the group consisting of soy products, gluten, milk products, whey products, egg products and nuts, 10-80% of a sweetener, up to 40% of a vegetable shortening or animal fat of any kind, up to 50% flour, and up to 8% of a leavening agent. The dough mix may be baked and served as a cookie, a muffin, a cake, a brownie or a snack bar.

The protein containing material may include 1-40% soy products, 1-40% wheat gluten or any other grain gluten, 1-20% milk products, 1-20% whey products, 0-50% egg products, 1-30% nuts, and mixtures thereof. The soy product preferably is soy flour which may include soy and all or any of its derivatives, including but not limited to isolated soy protein and tofu. The whey products are preferably milk derived solids selected from the group consisting of sweet dairy whey, neutralized acid whey, modified whey, whey protein concentrate, casein, modified casein, sodium casseinate, calcium caseinate and mixtures thereof. The milk products are preferably selected from the group consisting of whole milk, skim milk and cultured milk of any kind such as skim or whole, as well as buttermilk, acidophellic milk, yogurt, and cheese of any kind. The flour may be white, wheat, whole wheat, rye, barley, corn and/or bran of any kind such as oat, wheat, rice etc. bran. The sweetener is preferably selected from the group consisting of sucrose, glucose, fructose, and mixtures thereof, as well as fruit juices which may be fresh, frozen or concentrated, dehydrated fruit or fruit juices, honey, molasses, barley malt or any liquid sweetener and/or liquid syrup. The nuts are selected from the group consisting of peanuts, cashews, walnuts, almonds, macadamia nuts, Brazil nuts, hazelnuts, filberts, chestnuts and mixtures thereof.

DESCRIPTION OF THE PREFERRED EMBODIMENT

A high protein dough mix for a leavened bakery product. The mix includes a blend of water, a protein containing material, a sweetener, a vegetable shortening, flour and a leavening agent.

Water is present in the product as a dispersion medium for the other ingredients. The water content generally accounts for up to about 20% by weight of the product, not including the water present in other ingredients, for example, the milk products. Water preferably constitutes between about 5-8% by weight of the product.

The protein source of the protein containing material is selected from soy products, gluten, milk products, whey products, egg products and nuts. The protein containing material generally accounts for 10-80% by weight of the product, and preferably constitutes between about 20-60% by weight. The soy product preferably is soy flour which consists of finely ground and dried soybean meal. Preferably, soy flour comprises 1-40% by weight of the protein containing material, and may include soy and all or any of its derivatives including but not limited to isolated soy protein and tofu. Gluten may also comprise 1-40% by weight of the protein containing material. Gluten is a protein substance typically obtained from wheat flour that gives cohesiveness to dough. Wheat gluten is preferred for use herein, but any type of grain gluten may be employed. The protein containing material may also include 1-20% by weight milk products, preferably 10-18% by weight, which may be whole milk, skim milk, and cultured milk. The later is often referred to as baker's cheese. The cultured milk may be skim or whole, and the milk product may also include buttermilk, acidophellic milk yogurt, and cheese of any kind such as cottage cheese.

As noted above, the protein containing material may also include 1-20% by weight whey products. Preferably, the whey products constitute between about 5-18% by weight of the product. The whey protein used in the present invention can be derived from any cheese whey. Cheese whey is the by-product of the acid or rennet coagulation of protein (i.e., casein) in milk during the manufacture of cheese. The whey obtained from the acid coagulation is called acid whey and that obtained from rennet, sweet dairy whey. Other whey products that may be utilized are milk derived solids such as casein, modified casein, sodium caseinate, calcium caseinate, and mixtures thereof.

The acid coagulation of milk protein from milk involves either the addition of lactic acid producing bacteria (e.g., Lactobacillus sp.) or the addition of food grade acids such as lactic or hydrochloric acid (i.e., direct acidification). Regardless of the method used to acidify milk, acidification is allowed to proceed until a pH of about 4.6 is reached. At this pH, casein becomes insolubilized and coagulates as cheese curd. The cheese produced by this method is commonly known a cottage cheese. The whey obtained by the separation and removal of this cheese curd is called cottage cheese whey.

Sweet cheese whey is obtained by the separation and removal of coagulated casein produced by the addition of a proteolytic enzyme to milk. The proteolytic enzymes generally used are known as rennin and/or pepsin. Specific examples of cheese products produced by this general method are cheddar cheese, swiss cheese and mozzarella cheese.

The whey protein concentrates can be prepared from acid (cottage) or sweet (cheddar) whey or mixtures thereof as long as the whey protein is substantially undenatured and non-oxidized. If a milky or cheesy flavor is desired, the sweet whey source can be used. If a bland flavor is desired, the acid whey is preferred. Blends of acid and sweet whey can be used when a slight milky flavor is desired. The preferred cheese whey for use in preparing the concentrates used in the present invention is 100% sweet whey.

The cheese whey product may also be a protein concentrate. As used herein, the term whey protein concentrate relates to a whey protein product having 25% or more whey protein solids or powder.

The egg products comprise anywhere from 0-50% by weight and preferably 5-40% by weight egg whites, and 0-40% by weight egg yolks.

Additionally, the protein containing material may be selected from various types of nuts. For example, peanuts, cashews, walnuts, almonds, macadamia nuts, Brazil nuts, hazelnuts, filberts, chestnuts, and mixtures thereof may all be used. Typically, such nuts are ground to the desired particle size prior to incorporation in the mixture.

It should be noted that if the content of the protein containing material falls below 10% by weight the product has insufficient nutritional value, and above about 80% by weight the product becomes unpalatable. Thus, the gluten material is particularly desirable as gluten contributes to the taste of dough mixes.

The sweetener constituent of the present product amounts for about 10-80% by weight of the product. The sweetener is preferably selected from sucrose, glucose, fructose, fruit juices which may be fresh, frozen or concentrated, dehydrated fruit or fruit juices, honey, molasses, barley malt, or any liquid sweetener and/or liquid syrup, and mixtures thereof. The fructose may be provided in liquid form in the form of 90% high fructose corn syrup or in pure crystalline form available from such sources as Batterlite Whitelock or Corn Products International. Fructose is approximately one and one half times sweeter than other sugars such as sucrose and therefore a significantly lower amount may be utilized with the product of the present invention. Many diabetics may also find this type of sugar more medically acceptable. Artificial sweeteners, such as saccharin or aspartane, can also be used to replace part or all of the sweeteners noted above.

The present product also includes up to 40% by weight vegetable shortening or animal fat to provide the desired body and textures for the product. Any of the edible fats typically used to shorten baked goods, and in particular to shorten pastry dough, in order to make the dough tender and flaky may be utilized. This includes partially hydrogenated oils such as peanut oil, corn oil, soybean oil and the like.

As another shortening constituent, the present product includes up to 40% by weight of a butter such as peanut butter, walnut butter and almond butter. Preferably, butter utilized in amounts from about 2% to about 25% by weight is utilized.

As another ingredient in the present product, up to 50% by weight flour is added to provide sufficient body and/or fibers for the product. Any conventional flour may be utilized such as white flour, wheat flour, whole wheat flour, corn flour, rye flour, barley flour or other edible cereal grain meal, including bran of any kind, such as oat, wheat, rice, etc. bran.

Up to 8% by weight of a leavening agent is also used as a constituent in the present product. Typically, baking soda, baking powder, or yeast may be utilized.

The present product may also include a flavoring constituent which is selected from known flavoring ingredients according to the desired taste, taking into account the other ingredients. This constituent includes, but is not limited to and by way of illustration only, cheese cake, caramel, fruits such as strawberry or blueberry, and other natural and artificial flavorings. Note, however, that the ingredient range as specified herein, unless stated otherwise, are for an unflavored product. Additionally, it should be noted that fresh fruits such as strawberries, blueberries, bananas and the like may be incorporated as one of the ingredients of the product up to a total of about 30% by weight of the product, if desired.

The invention will be more fully understood in light of the following specific examples which are set forth below for illustration purposes only and are not intended to be limiting. In the examples, all percentages are by weight unless otherwise noted.

EXAMPLE 1

Examples of the new product formulated with three different compositions as a cookie and processed in the foregoing manner were prepared with the following ingredients:

| Ingredient | Percent By Weight | | |
|---|---|---|---|
| SOY FLOUR | 11.8 | 10.7 | 13 |
| GLUTEN | 6.5 | 8 | 7 |
| FLOUR | 8 | 8 | 7 |
| MILK | 6.5 | 5.3 | 7 |
| WHEY | 2.6 | 4 | 9 |
| SUGAR | 16 | 16 | 14 |
| CRISCO | 8 | -0- | 8 |
| PEANUT BUTTER | -0- | 16 | 16 |
| EGGS | 26.3 | 21.3 | 13.3 |
| SPICES | 1.3 | -0- | 0.7 |
| FLAVORS | 4 | 5.3 | 2.8 |
| SALT | 0.5 | 0.5 | 0.4 |
| BAKING SODA | 0.5 | 0.5 | 0.4 |
| LIQUID SUGAR | 8 | 4.4 | 7.4 |

Other examples of the new product were prepared with the following three different compositions of ingredients as a cake:

| | Example 2 | | |
|---|---|---|---|
| Ingredient | Percent By Weight | | |
| SHORTENING | 7 | 4.7 | -0- |
| PEANUT BUTTER | 6.1 | 12.2 | 13 |
| SUGAR | 18.4 | 17 | 17 |
| EGG | 12.3 | 18.9 | 27 |
| MILK | 7 | 5.6 | -0- |
| SOY FLOUR | 19.3 | 13.6 | 15.7 |
| GLUTEN | 8.8 | 11.3 | 6.5 |
| FLOUR | 1.75 | 4.7 | 5 |
| WHEY | 7 | 4.7 | 2.6 |
| WATER | 5.2 | -0- | 7.22 |
| NUTS | 5.6 | -0- | 5.2 |
| FRUIT | -0- | 5.16 | -0- |

-continued

| Example 2 | | | |
|---|---|---|---|
| Ingredient | Percent By Weight | | |
| SPICES | 0.5 | 0.7 | -0- |
| SALT | 0.35 | 0.37 | 0.26 |
| BAKING SODA | 0.35 | 0.37 | 0.26 |
| BAKING POWDER | 0.35 | 0.7 | 0.26 |

A third example of the new product was formulated with three different compositions in the form of brownies in the following manner:

| Example 3 | | | |
|---|---|---|---|
| Ingredient | Percent By Weight | | |
| EGGS | 15.8 | 16.5 | 15.4 |
| PEANUT BUTTER | 11.3 | 14 | 15.4 |
| SUGAR | 22.6 | 17.8 | 18 |
| LIQUID SUGAR | 5.6 | -0- | 7.7 |
| CHOCOLATE | 4 | 4 | 3.6 |
| SHORTENING | 2.2 | 3 | 0.2 |
| SALT | 0.2 | 2.7 | 0.2 |
| BAKING SODA | 0.2 | 1 | 0.2 |
| EXTRACT | 0.5 | 0.6 | 0.5 |
| WATER | 9 | 6 | 4.1 |
| SOY FLOUR | 17.6 | 26.3 | 16.3 |
| GLUTEN | 4.5 | 4.7 | 6.1 |
| FRUIT | -0- | 4.7 | 2.5 |
| NUTS | 3.4 | -0- | 2 |
| COCOA | 2.2 | 3.5 | 5 |
| SPICES | 0.9 | 0.6 | -0- |

The following example illustrates the new product in the form of a muffin. The resulting products had an excellent taste and firm texture.

| Example 4 | | | |
|---|---|---|---|
| Ingredient | Percent By Weight | | |
| SOY | 9.3 | 22 | 15 |
| GLUTEN | 4.3 | 3.6 | 6.7 |
| FLOUR | 6.9 | 3.6 | 11.7 |
| SUGAR | 8.3 | 9 | 13.4 |
| MILK | 4.3 | 7 | 6 |
| LIQUID SUGAR | 14.4 | 4.5 | -0- |
| WHEY | 2.9 | 4.5 | 4.2 |
| BUTTER | -0- | 3.6 | 8.4 |
| PEANUT BUTTER | 3.6 | 9 | 15 |
| EGGS | 22.4 | 12.6 | 13.4 |
| BAKING POWDER | 0.7 | 0.7 | 0.6 |
| BAKING SODA | 0.22 | 0.3 | 0.3 |
| SALT | 0.43 | 0.5 | 0.5 |
| SPICES | 0.11 | 0.2 | 0.1 |
| FLAVORS | 0.75 | 0.9 | 0.8 |
| YOGURT | 21.45 | -0- | -0- |
| WATER | -0- | 18 | 4 |

Examples of the new product formulated as a snack bar and processed in the foregoing manner were prepared with the following ingredients.

| Example 5 | | | |
|---|---|---|---|
| Ingredient | Percent by Weight | | |
| ALMOND BUTTER | 14.8 | 11 | 20 |
| EGGS | 11.8 | 12.4 | 10.8 |
| WATER | 9 | 10.8 | 10 |
| SUGAR | 24.7 | 17.4 | 22 |
| LIQUID SUGAR | -0- | 3 | 5.7 |
| CHOCOLATE | 12 | -0- | -0- |
| NUTS | -0- | 7.2 | 3.4 |
| FRUITS | -0- | -0- | 2.2 |
| SOY FLOUR | 15.6 | 20.6 | 14.1 |
| GLUTEN | 2.5 | -0- | 4.5 |
| FLOUR | 1.2 | 2 | 2.3 |
| WHEY | 1.8 | 3 | 1.1 |
| MILK | 6 | 11.6 | 3.4 |
| SPICES | 0.6 | 1 | 0.5 |

Various modes of carrying out the invention are contemplated as being within the scope of the following claims particularly pointing out and distinctly claiming the subject matter regarded as the invention.

I claim:

1. A high protein dough mix for a leavened bakery product consisting of, by weight, in unflavored form, a blend of a up to 20% water, 20–80% of a protein containing material selected from the group consisting of soy products, gluten, milk products, whey products, egg products and nuts, 10–80% of a sweetener, 10–20% of vegetable shortening, up to 50% flour, and up to 8% of a leavening agent.

2. The mix of claim 1 wherein said protein containing material includes 1–40% soy products, 1–40% gluten., 1–20% milk products, 1–20% whey products, 0–50% egg products, 1–30% nuts, and mixtures thereof.

3. The mix of claim 2 wherein said whey products are milk-derived solids selected from the group consisting of sweet dairy whey, neutralized acid whey, modified whey, whey protein concentrate, casein, modified casein, sodium caseinate, calcium caseinate and mixtures thereof.

4. The mix of claim 2 wherein said milk products are selected from the group consisting of whole milk, skim milk, cultured milk, buttermilk, yogurt, acidophellic milk, and cheese.

5. The mix of claim 2 wherein said sweetener is selected from the group consisting of sucrose, glucose, fructose, fruit juices, dehydrated fruit, dehydrated fruit juices, honey, molasses, barley malt, liquid sweeteners, liquid syrups, and mixtures thereof.

6. The mix of claim 2 wherein said nuts are selected from the group consisting of peanuts, cashews, walnuts, almonds, macadamia nuts, Brazil nuts, hazelnuts, filberts, chestnuts, and mixtures thereof.

7. The mix of claim 2 wherein said soy products are selected from the group consisting of soy, soy flour, soy derivatives, isolated soy protein and tofu.

* * * * *